United States Patent [19]
Gunderson

[11] 4,156,420
[45] May 29, 1979

[54] SOLAR HEAT COLLECTOR
[76] Inventor: Charles F. Gunderson, 1622 N. Marconi Rd., Belmar, N.J. 07719
[21] Appl. No.: 815,208
[22] Filed: Jul. 13, 1977

Related U.S. Application Data
[63] Continuation-in-part of Ser. No. 566,730, Apr. 10, 1975, abandoned.
[51] Int. Cl.² .................................................. F24J 3/02
[52] U.S. Cl. ................................. 126/271; 237/1 A
[58] Field of Search ................ 126/270, 271; 237/1 A

[56] References Cited
U.S. PATENT DOCUMENTS

| | | | |
|---|---|---|---|
| 1,946,184 | 2/1934 | Abbot | 126/271 |
| 1,989,999 | 2/1935 | Niederle | 126/271 |
| 3,125,091 | 3/1964 | Sleeper, Jr. | 126/271 |
| 3,227,153 | 1/1966 | Godel et al. | 126/271 |

*Primary Examiner*—Kenneth W. Sprague
*Attorney, Agent, or Firm*—Charles F. Gunderson

[57] ABSTRACT

A solar heat collector uses elongated, tubular, outer casings, in a fixed position with respect to the solar orbit, surrounding inner tubular sections, carrying heat-conductive fluid. The outer casings are highly transparent and the walls of the outer casings are of substantial thickness and of a high refractive index to admit solar heat energy and to focus it on or towards the inner tubular sections or tubes that are of highly conductive material and have dark, heat-absorbing surfaces.

One of the sides of the outer casings faces toward the sun. The other of the sides of the outer casings are coated with a highly reflective material to reflect any solar heat energy that by-passes the tubes, back to the inner tubes.

Each of the casings is mounted in a substantially vertical plane, and the solar heat collector would normally consist of a plurality of such casings, or units, mounted side by side in a fixed plane approximately normal to the noonday, winter sun, or perpendicular to the sun's orbit.

The upper and lower ends of the tubes are connected to a system for storing or using the heat-conductive fluid after it is warmed by the solar energy.

11 Claims, 7 Drawing Figures

U.S. Patent  May 29, 1979  4,156,420
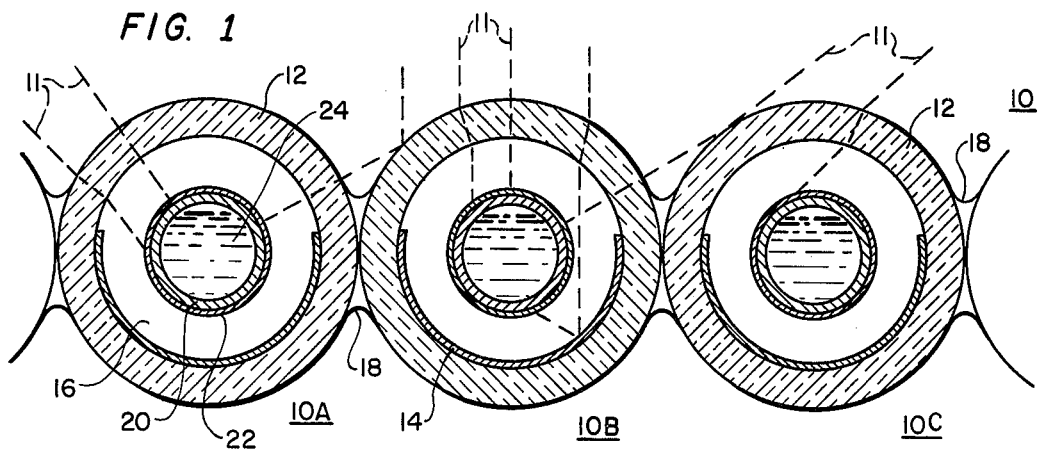
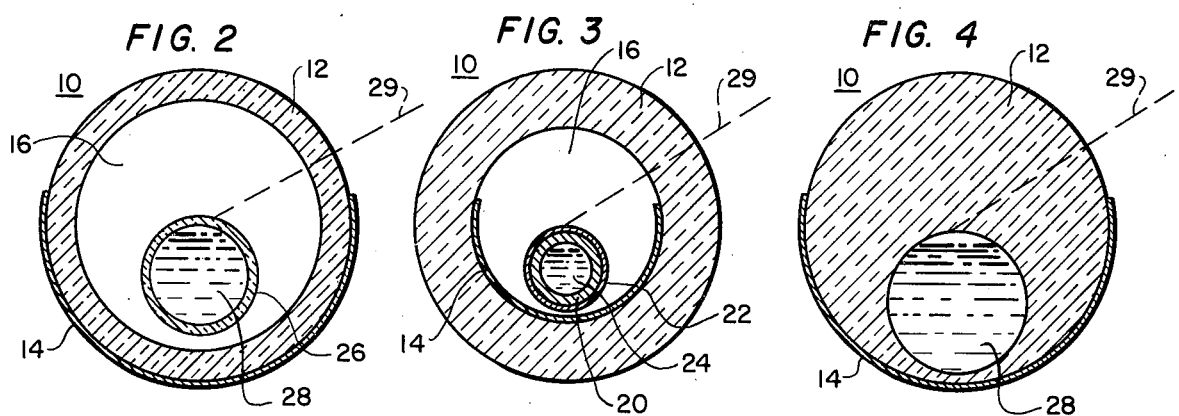
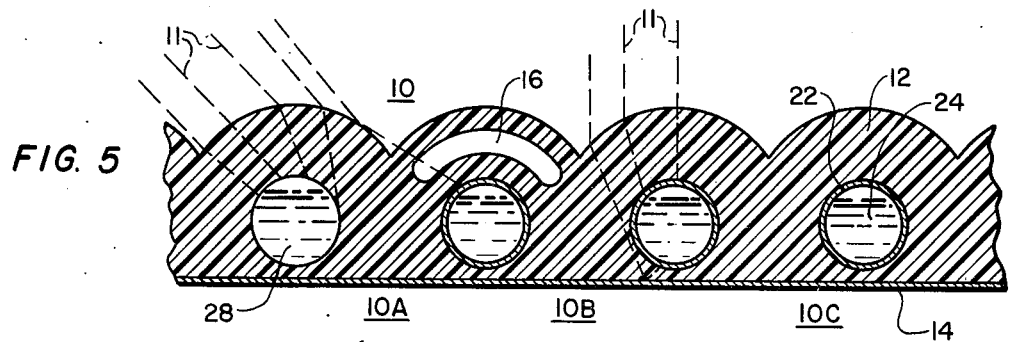
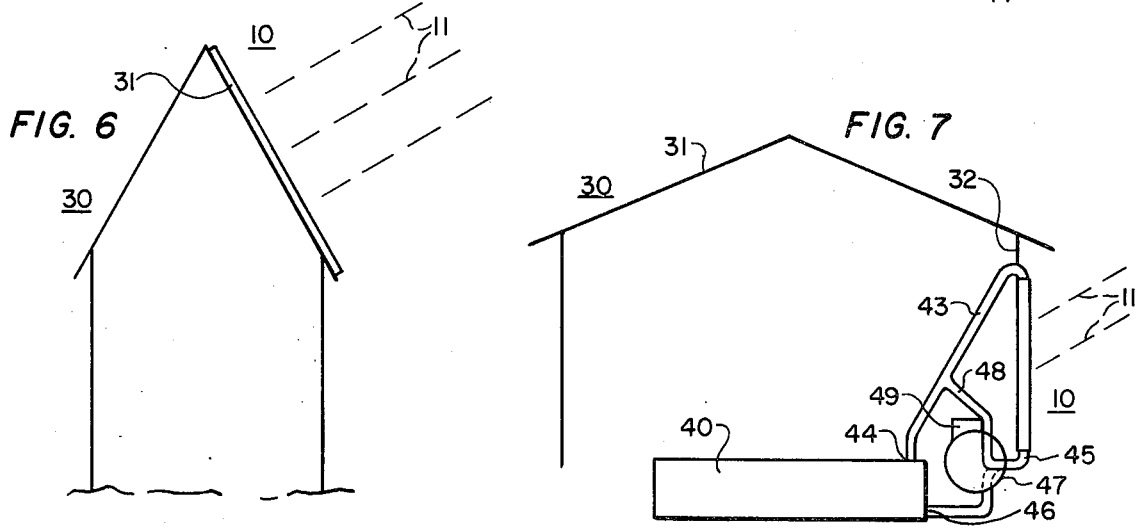

SOLAR HEAT COLLECTOR

The invention is a continuation-in-part of the copending Patent Application of Charles F. Gunderson, Ser. No. 566,730, for a "Solar Heat Collector" filed Apr. 10, 1975 now abandoned.

FIELD OF THE INVENTION

This invention relates to solar heat collectors and particularly to solar heat collectors that use a fluid to absorb solar energy in the form of heat, and transmit it to a remote point for storage or use. More particularly, this invention relates to a solar heat collector using a series of fixed units, mounted vertically, side by side, in a plane perpendicular to the sun's orbit, and having both refractive and reflective facilities for the collection of solar heat energy.

BACKGROUND OF THE INVENTION

There have been many devices proposed for the collection of solar energy, and, as time goes on, there would appear to be an ever-increasing need for solar heat energy to take the place of the diminishing fossil fuel energy.

The basic, practical, solar heat collectors in use today, particularly in private homes, use a form of flat plate of highly-conductive metal with a blackened, heat-absorbing surface facing generally toward the south. A series of highly-conductive metal tubes are physically bonded to these plates, in a pattern that effectively covers most of the area of the plates, to carry away the solar heat energy as it is collected.

This type of heat collector is simple and fairly effective, but it must have some form of insulation between the metal plate and the cold outside air to be useful. This insulation is usually provided by a pane of glass or plastic, positioned in front of the flat plate, that establishes a layer of insulating air between the metal plate and the outside air. Double-pane glass may be needed to provide adequate insulation and to reduce condensation. The air space provided by the flat pane of glass would be difficult to seal against moisture, and would be almost impossible to evacuate. This type of air space would induce convection currents that would be difficult to control, and would be an inevitable loss of efficiency.

The pane of glass decreases the solar energy that reaches the metal plate, and the efficiency of these solar heat collectors vary as the angle of incidence between the sun and the pane of glass decreases. These solar heat collectors are no longer useful when the sun's angle of incidence equals the angle of reflection of the glass.

Another factor is that there is only a certain amount of solar energy falling on a given area in a given time, and this energy, over the whole area, can only raise the temperature of the plate to a given, limited level. For practical purposes, this means that more storage facilities are needed for a given amount of heat energy at the given, limited, temperature level than would be needed for the same amount of heat energy at a higher temperature.

There are several solar heat collectors or furnaces that have been proposed that concentrate the solar energy onto a smaller area. Most use lenses or reflectors to focus the rays of the sun onto a point or area to be heated. This provides a concentration of solar heat energy that can raise the temperature at the focal point to almost any desired level, in a well known manner.

The heat generated by these means may be used at that point, or in some cases, may be transmitted to a remote point as hot water or steam. However, almost all of these concentrated heat collectors require that the collector be directed towards the sun at all times to focus the solar energy onto the precise point being heated.

Such direction of the solar heat collector towards the sun necessitates a highly-precise machine that must be synchronized with the sun's orbit each day. The machine must have enough structural strength to support the entire collecting system, and have heavy enough bearings to move the structure against its own friction as well as against the potential forces of the winds, etc. This leads to inescapable mechanical problems and, ultimately, limits the collector system to a size and weight that can be supported, pivoted, and controlled. The motors, or other mechanism for moving the structure are, inevitably, a source of power expenditure that can only reduce the ultimate efficiency of the system.

SUMMARY OF THE INVENTION

In the subject invention, any desired number of elongated, substantially-tubular, transparent outer casings are mounted, side by side, in vertical planes, but all in a common plane that is generally perpendicular to the zenith of the sun's winter orbit. The tubular casings should have a substantial thickness to provide physical strength, thermal insulation, and the maximum refraction of the sun's rays into a given area of each casing.

An inner tubular section — that may be a tube of highly-conductive material, with a blackened heat-absorbing surface — is positioned along the given area close to the other side of the outer casings, away from the sun, of each of a corresponding one of the outer tubular casings. These inner tubular sections are filled with a heat-conductive fluid to carry away the heat absorbed by the tube or the fluid. An air space may be provided between the outer casing and the inner tubular section, and may be evacuated.

The sides of the tubular casings away from the sun are coated with a highly-reflective material, on the inside or the outside of the casings, to reflect, back to the inner tubular sections, any of the solar energy that does not impinge on the inner tubular sections in the first place.

The tubes may be connected, hydraulically, in parallel or in series and they are, ultimately, connected to a utilization system wherein the heated liquid may be stored or used on demand. Thermostatic means should be used to cut off the flow of fluid to the utilization system when the solar energy is not enough to raise the temperature of the fluid above a desired level.

This solar heat collector is simple, functional, and economical. It can be manufactured at a relatively low cost, and it provides a relatively-high temperature through the focusing of a wide strip of solar energy on a relatively-narrow, heat-absorbing tubular section. This focusing of the solar energy along the length of the tubes is substantially constant throughout the major portion of the sun's daylight orbit, without any movement of the collector or the need for machinery for such movement.

Since this is a fixed mounting, the length of the casings and the number of the casings is almost unlimited. The units are self-insulating, and the overall system is compatible with many water storage or hot water heating systems. This system provides its own gravity, fluid circulation. It is structurally strong, easy to maintain, and architecturally attractive. It is also quite flexible, in that units can be added, as needed, to increase the amount of heat energy produced, or removed for repair or replacement, if necessary.

BRIEF DESCRIPTION OF THE DRAWINGS

FIG. 1 shows a cross section of a portion of a variation of a typical solar heat collector in accordance with this invention;

FIGS. 2, 3 and 4 show cross sections of variations of the individual units of such a collector;

FIG. 5 shows a cross section of a portion of another variation of such a heat collector; and FIG. 6 and 7 show profiles of typical homes with solar heat collectors of these types.

DETAILED DESCRIPTION

Referring to the drawings, a variation of a solar heat collector in accordance with this invention, has units 10A, 10B, etc. mounted in a substantially flat plane, facing the orbit of the sun's rays 11. The units comprise elongated, tubular outer, optically-refractive casings 12; reflective material 14; and conductive fluid 24, that may be confined in elongated tubular sections or tubes 20. A space 16 may be provided for insulation between the casings 12 and the tubes 20, and this space may be evacuated.

In FIGS. 1, 2 and 3, the casings 12 are substantially tubular, and contain the tubes 20 that carry the fluid 24. Tubes 20 may have an outer, blackened, heat-absorbing surface 22.

FIG. 2 shows the reflective material 14 on the outer surface of the casing rather than on the inner surface of the casing as shown in FIGS. 1 and 3. This figure also shows that a glass or plastic tube 26 may be used with a darkened liquid 28, and that the inner tubular section may have a more efficient location in the lower portion of the outer tubular casing.

FIG. 3 shows the metallic inner tube 20 again, but off-center with respect to its outer casing, in a location similar to that of FIG. 2.

FIG. 4 shows a species wherein the space 16 between the outer casing 12 and the fluid-carrying tube 20 is eliminated for simplicity and economy. The darkened liquid 28 again collects the solar heat.

FIG. 5 shows a variation of the specie of FIG. 4 wherein the casings 12 are molded together or joined to provide multiple units 10A, 10B, etc. In this case, the sides of the units away from the sun are flattened and a continuous reflective surface 14 can be used. This figure shows that a heat absorbing surface 22 may be applied to the walls of the inner tubular portions, or that a darkened liquid 28 may be used to absorb the solar energy.

FIG. 6 shows a profile of a typical house 30 with a relatively steep roof 31 whereon a solar heat collector 10 can be mounted and can conform, esthetically, with the outline of the structure of the house. An "A frame" structure, not shown, would also be ideal for this purpose.

FIG. 7 shows a profile of another typical house 30 with a relatively flat roof 31 that would not be particularly suitable for a heat collector mounting. Here, a solar heat collector 10 can be mounted on a side wall 32.

FIG. 7 also shows the other elements of a typical, solar heat collecting system, which would include a fluid storage container or tank 40. A pipe 43 connects the upper openings of parallel-connected tubes 20, not seen, to an inlet 44 to the tank. A pipe 45 connects the lower openings of the parallel-connected tubes 20 to an outlet 46 of the tank, through a valve 47. A by-pass pipe 48 should be provided through the valve 47, shown in a closed position, to permit the thermal circulation of the fluid in the tubes, as soon as the solar energy strikes the units, without the possibility of cooling the already-heated fluid in the storage tank.

A thermostat 49 in the by-pass pipe 48 controls the valve 47 to keep the valve closed and block the flow of fluid from the tubes to the tank until the temperature of the fluid flowing through the by-pass tube 48 is above a pre-set level, or that of the fluid in the tank. When the temperature of the fluid through the by-pass is above the pre-set level, the valve 47 is switched to its alternate open position, and the heated fluid flows into the storage tank. The thermostat and the valve can be in either the outlet pipes, as shown, or in the inlet pipes, or in both.

In FIG. 7 it is noted that the plane of the collector 10 is the same as that of the wall, which would provide architectural, structural, and esthetic advantages that might be more important than the slight loss of effective solar heat due to the few degrees of offset of the sun's rays in mid-winter. The several degrees of offset in the spring and fall would be less significant, since the heat requirements would be relatively lower, and the summer losses would not be important.

While the heat collector need not point directly at the sun, or its orbit, variations should be toward the vertical rather than the horizontal. A horizontal placement would tend to collect dirt and debris, and have less gravity flow of the heated fluids within the tubes. Also the transition between summer and winter solar orbits and angles would be less desirable, with more heat in the summer and less in the winter.

To illustrate the principle of this solar heat collector, typical solar rays 11 are shown in FIGS. 1 and 5. Since these figures are cross sections of substantially vertical collectors, facing south, the rays 11 indicate various positions of the sun from east (left-hand) to west (right-hand). The solar rays striking the central portions along the axes of the casings 12 will pass straight through to the tubes 20, or will be refracted enough to strike the heat absorbing surfaces of the tubes. The solar rays striking the outer casings off center may not be refracted enough to hit the tubes 20, but will hit the reflective surfaces 14 and be reflected back to the rear surfaces of the tubes 20, which are also coated with heat absorbing material 22.

Between the refractive and the reflective portions of each unit, it will be seen that almost all of the solar energy falling on the collector is concentrated on the fluid containing tubes.

The focusing of the solar energy onto the heat absorbing tubes will depend on the thickness and the index of refraction of the tubular casing material. Both should be as great as possible without significant loss in transparency, since, obviously, any loss in transparency would decrease the efficiency of the system. The sharper the focus, and the greater the ratio between the diameters of the outer casings and the heat absorbing tubes, the higher the concentrations of solar heat energy in the fluid and the higher the temperatures that can be reached.

The size and the placement of the metallic tubes 20 can also be varied to some degree to receive the maximum concentration of the solar energy over the greater portion of the solar orbit. Although this concept is based on an effective focus of solar energy onto a narrow central portion of each unit over a substantial portion of the sun's orbit, for all practical purposes, only about ninety degrees of the sun's orbit may be useful. It may be more effective for orientation of the elements to favor the maximum use of the solar heat energy under optimum conditions. A rigorous concentricity may not be the best compromise.

The optimum size and shape of the inner tubular portion 20 will depend on the actual portion of the solar orbit that is worth considering. As the sun sets the solar energy must decrease, and as the angle of incidence of the solar beams decrease, in any rigid collector, the efficiency must decrease. Consequently, the decreasing solar energy and decreasing efficiency lead to a practical limit of effective orbit. In other words, there would be no point in trying to make variations in the design to accommodate extreme angles of solar orbit, if such variations would decrease the efficiency of the collector through the prime, central portion of the solar orbit.

Since both refractive and reflective focusing of the suns rays are involved here, the maximum efficiency would be achieved by locating the inner tubular portion 20 where either refracted or reflected rays must strike this portion. If the inner tubular portion is of too large a diameter, or substantially above the central axis of the collector, some of the energy that could have been reflected back to the tubular portion strikes it directly. If the tubular portion is too small, both direct and reflected rays can miss it entirely.

The irreducible size and the optimum position of the inner tubular portion 20 would then appear to be with its one side facing the sun about tangent to a line, such as 29 of FIGS. 2, 3 and 4, through the center of the tubular structures, representing the lowest angle for practical solar heat collection. For practical purposes, again, this minimum angle may be chosen as tangent to the outer tubular casing of the adjacent collector.

If the tubular portion 20 were below this line, both the direct and the reflected rays at 29 would miss the inner tubular portion. When the tubular portion meets this line, all the rays above this line will be refracted and reflected back to the inner tubular portion, and all rays below this line will strike the inner tubular portion directly. The other side of the tubular portion away from the sun should be close enough to the reflective means of the outer tubular casing so that no reflected rays can by-pass the inner tubular portion.

Any larger inner tubular portion would be redundant, more costly, provide less concentration of solar energy and be less efficient. Any smaller inner tubular portion would lose some of the solar energy, and also be less efficient.

Nevertheless, the applicant does not wish to limit himself to this precise geometry, since larger or smaller inner tubular portions will function adequately within the teachings of this invention. For example, larger tubes would provide a greater flow of water at lower temperatures, and other sizes and shapes and configurations may be preferable for other reasons.

When separate inner tubular portions, or tubes, are employed, as in the FIGS. 1, 2 and 3, they may be of metal, as in FIGS. 1 and 3, or of glass or plastic as in FIG. 2. The metal tubes would have advantages of strength and might simplify the plumbing part of the collector, but they would present problems in vacuum sealing because of the differences in thermal expansion. However, this might be overcome by slip joints or flexible gaskets of well known types. Also a portion, or the entire length, could be a form of sylphon tubing that could easily accommodate the differences in expansion between the inner tubular sections and the outer casing. The sylphon tubing might increase the resistance to the flow of fluids, but it would also provide an increased surface area for absorptive coating, and similarly, for transfer of heat to the fluid 24.

The glass tube 26 of FIG. 2 would not present a problem in thermal expansion for bonding or hermetically sealing of this inner tubular section to the outer casing 12 for a permeant vacuum. As noted earlier, the liquid in such a tube could be dark enough to absorb the solar energy. Alternatively, the tube itself could be of a darkly colored glass, or the inside surface of the glass tube could be coated with an absorptive coating, such as 22, not shown here, as in 22 of FIG. 5, that would provide the necessary heat transfer without effecting the expansion of the glass.

The coating 22 on the outside of the metallic tubes 20 should be the most effective, and the most efficient available. A blackened surface will be effective of course, but a selective surface material that absorbs both direct and reflected energy — but minimizes radiation of the heat energy — will be preferable. Such a coating would also be applicable to the interior linings such as 22 of FIG. 5, and would also be applicable to the species of FIGS. 2 and 4.

For the outer casings, glass tubes are readily available and would be quite satisfactory, but plastics may be less fragile and less likely to be damaged by temperature changes or mechanical pressure. Plastics may also have higher indices of refraction, which, along with transparency would be desirable here. Plastics may also lend themselves more readily to variations in the unit size and shape, and to multiple-unit construction. A combination of glass and plastic layers, with or without additional air spaces, could also be used.

The species of FIGS. 1 to 3 show an air space 16 between the outer casings 12 and the tubes 20 or 26. In these species, the upper and lower ends of the tubes and casings would be sealed, hermetically if necessary, to control the air space. This space would reduce the weight of the individual units, and, possibly, the material cost, but, most important, it would provide a considerable and valuable insulation factor between the fluid-filled, heat-collecting tubes 20 or 26 and the outer air. This insulation might be enough to preclude any urgent need for additional outer glass or plastic layers to provide air space and insulation.

More important, this air space can be evacuated to a relatively high degree because of the optimum tubular mechanical configuration and the potential thickness of the walls of the tubular casings. This evacuated space would provide obvious improvements in insulation and additional substantial reduction of heat losses. These small air spaces 16 can, in any case, be controlled very easily with dehydrating agents to reduce the possibility of condensation that could be a problem with this or any other system.

Where separate tubes and casings are used, as in FIGS. 1, 2 and 3, the position and configuration of the air spaces 16 will be predictable. However, air spaces can also be provided in the species of FIGS. 4 and 5, particularly in the critical region between the outer surface of the one side of the outer casing, and the tubular section. A typical example of this is seen in the air space 16 shown in unit 10B of FIG. 5.

The species of FIGS. 4 and 5 may not need to have the air space, and they do provide a much simpler configuration and a relatively thicker wall of casing material. With the lower heat conductivity of some plastics, and the mechanical and cost advantages that are inherent in these species, the probable increase in heat losses due to conductivity and contact with the outer air may be outweighed by the other advantages.

In these species, a thin, conductive tube, not shown, may be embedded in the plastic, or a tubular section may be provided within the plastic, for carrying the fluid 24. Such a tubular section may be lined with a heat-absorbing, conductive material 22 to transmit the solar energy to the fluid. Alternatively, a dark, heat-absorbing fluid may be used, to absorb the solar heat energy.

These species lend themselves to extrusions, or to molding techniques, with obvious manufacturing advantages. There is also less limitation as to the sizes and the numbers of tubes and casings that may be provided, except that the smaller the diameter of the fluid carriers, the more impedance to the fluid flow.

Extrusion or molding techniques lend themselves to multiple units, as seen in FIG. 5, along with many other variations that suggest themselves. The shape of the side toward the sun may be varied for maximum effective use of the solar energy, and the shape of the side away from the sun may also be varied for the most effective reflection of stray solar energy back to the tubular sections.

It may be desirable to provide multiple units for economy of manufacture, construction, and assembly. It will be much easier to put up a few, prefabricated panels than the equivalent number of single units.

With extrusion techniques, it would also be possible to include an air space of any desired size and shape, between the solar side of the casing and the tubular section that carries the fluid. This type of air space — mentioned earlier — is seen in FIG. 5. This space, which can very easily be sealed at the ends, and in some cases, evacuated, would increase the efficiency of these collectors and reduce the overall weight without materially increasing the unit cost. Variations of this will suggest themselves to anyone skilled in the art.

The reflective material 14 may be deposited inside of the casings as shown in FIGS. 1 and 3, but it may also be deposited or applied on the outside of the casing, as shown in FIG. 2. It may also be applied in sheet form along the backs of the casings in a curved form, or in the flattened form of the units of FIG. 5.

If a heat collector of this type were to become, physically, the outer wall of a house, for economy of construction, or esthetic reasons as well as for heating considerations, the reflective surface 14 could, in fact, be controllable, to permit the choice of letting a certain amount of light filter into the room, or reflecting all of the solar energy back to the collector tubes.

The sizes of the tubular sections would be dictated by the focusing effect that is practical through the casings and the reflective surfaces; the temperature level that is desired; the size of the interior of the casings; and the amount of air space or vacuum that may be required for highest efficiency. The positions of the tubular sections, as noted earlier, and their shapes, may also be varied to be in the optimum focus of the sun's rays during the optimum heat collecting time.

If separate tubes are used, the walls of the tubes must be highly conductive and as thin as possible without sacrificing the strength necessary to support the fluid and withstand its pressure. Spacers would presumably be needed along longer units to support the tube and maintain uniform spacing with respect to the casing. Such spacer would have negligible losses and could reduce undesirable convection currents where the air spaces are not evacuated.

The outer casings are intended to be exposed directly to the outside air, and presumably, would be mounted on a roof or wall on the south side of a house. In new construction, the house can be oriented so that one side faces south and the heat collector is in an optimum position, thermally, as well as esthetically. Solar energy falling on the collector can be supplemented by reflecting pools or the like in a well known manner.

If the species between the units of FIG. 1 are sealed by a compound 18, as seen in FIG. 1, or multiple units are provided, as in the species of FIG. 5, it is apparent that the heat collector can be made air tight and water tight, and can be the actual outer wall — certainly the siding, if not a structural wall — of the house, with obvious cost advantages. The heat collectors may be tilted to face the winter solar orbit, or they may be vertical as seen in FIG. 7.

Additional heat may be generated by longer units or by adding additional units, but, where space is at a premium, more efficiency may be had through better insulation of the individual units. Besides the high vacuum insulation space that is possible with this concept, additional, transparent, concentric casings, not shown, which may also have an evacuated air space, may be provided. Alternatively, this solar heat collector can be positioned behind a conventional insulating pane of glass.

The fluids that would be applicable here would include almost any heat conductive liquids. Water would be an obvious choice because of its availability, low cost and compatibility with existing hot-water heating systems. Antifreeze mixtures may be necessary where freezing would be possible in extremely cold conditions and during periods of lack of solar energy. Darkened fluids, as noted earlier, are also suggested where the sunlight strikes the liquid directly.

With relatively-long vertical tubes, and low-friction connecting pipes, gravity circulation will be predictable and adequate. However with longer lines between the heat collectors and storage units, or where the friction of the pipes or other factors suggest more circulation, water pumps of well known types can be used in a well known manner.

This solar heat collector can obviously be used to warm water for domestic purposes, in either winter or summer.

The ends of the casings and the tubes of each unit must be sealed hermetically if a vacuum space is intended, and any of the many couplings between glass or plastic and metal would be applicable here. Similarly, the couplings between the tops and the bottoms of the tubes and the rest of the fluid system could be standard plumbing fittings.

It is to be understood that I do not desire to be limited to the exact details of construction shown and described, for obvious modifications will occur to a person skilled in the art.

What is claimed is:

1. A solar heat collector comprising at least one elongated, cylindrical, tubular, outer, casing of transparent material;

means for positioning said outer casing in a vertical plane and in a fixed plane substantially perpendicular to the winter solar orbit, with one cylindrical side of said outer casing facing said solar orbit, whereby a substantial portion of the solar heat energy impinging on said outer casing is refracted towards a given portion within said tubular outer casing, said given portion being located between the axis of said cylindrical side of said outer casing and the other side of said outer casing;

reflective means applied to said other side of said tubular outer casing;

a single elongated cylindrical, tubular section positioned along said given portion within said outer tubular casing, said elongated tubular section having one side toward said solar orbit along the axis of said cylindrical side of said tubular outer casing, and an other side, away from said solar orbit, adjacent to said reflective means, whereby substantially all of said solar heat energy will be refracted or reflected to said tubular section during said solar orbit;

a heat-conductive fluid contained within said elongated tubular section;

heat absorbing and conducting means associated with said heat-conductive fluid for applying said solar heat energy to said fluid within said tubular section; and means for connecting said elongated tubular section to a system for using heat-conductive fluids.

2. A solar heat collector as in claim 1 wherein said elongated tubular section is a hole through said outer casing.

3. In a solar heat collector as in claim 1, at least one elongated space within said casing, positioned between said cylindrical side of said outer casing and said elongated tubular section, to provide insulation between said heat-conductive fluid and the atmosphere on the outside of said cylindrical side of said outer casing.

4. A solar heat collector as in claim 1 wherein said single elongated tubular section is a separate tube of transparent material.

5. A solar heat collector as in claim 1 wherein said heat absorbing and conducting means is a dark colored material within said heat-conductive fluid.

6. In a solar heat collector as in claim 3, means for sealing the ends of said elongated space between said cylindrical side of said outer casing and said elongated tubular section, at both ends of said outer casing, and means for evacuating said elongated space.

7. A solar heat collector as in claim 1 wherein said heat absorbing and conducting means is a coating on the walls of said elongated tubular section.

8. A solar heat collector as in claim 1 wherein said elongated tubular section is a separate tube of highly-conductive material, and said heat absorbing and conducting means is a coating on the outside of said separate tube.

9. A solar heat collector as in claim 8 wherein said separate tube of highly conductive material includes at least a portion of sylphon tubing to compensate for the difference in thermal expansion between the material of said outer tubular casing and said elongated tubular section of highly-conductive material.

10. A solar heat collector as in claim 1 having a plurality of said elongated tubular casings mounted, side by side, in a plane perpendicular to said solar orbit;

means for sealing the spaces between adjacent casings; and means for coupling said elongated tubular sections together.

11. A solar heat collector, as in claim 10 wherein said adjacent sides of said outer casings are substantially flattened and joined together, and said other sides of said outer casings are substantially flattened for compactness and material savings, and said reflective means is a continuous layer of reflective material along said other sides of said outer casings.

* * * * *